(12) United States Patent
Wang et al.

(10) Patent No.: US 10,281,809 B2
(45) Date of Patent: May 7, 2019

(54) PROJECTION APPARATUS AND ILLUMINATION SYSTEM

(71) Applicant: Coretronic Corporation, Hsin-Chu (TW)

(72) Inventors: Chia-Hao Wang, Hsin-Chu (TW); Chi-Tang Hsieh, Hsin-Chu (TW); Yao-Shun Lin, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 15/815,723

(22) Filed: Nov. 17, 2017

(65) Prior Publication Data
US 2018/0143519 A1 May 24, 2018

(30) Foreign Application Priority Data
Nov. 18, 2016 (CN) .......................... 2016 1 1018066

(51) Int. Cl.
*G03B 21/20* (2006.01)
*G03B 33/08* (2006.01)
(52) U.S. Cl.
CPC ....... *G03B 21/204* (2013.01); *G03B 21/2066* (2013.01); *G03B 21/2093* (2013.01); *G03B 21/2013* (2013.01); *G03B 33/08* (2013.01)
(58) Field of Classification Search
CPC .............. G03B 21/204; G03B 21/2066; G03B 21/2093; G03B 21/2013; G03B 33/08; G03H 2223/24
USPC .......................................................... 353/84
See application file for complete search history.

(56) References Cited

U.S. PATENT DOCUMENTS

| 2011/0199580 | A1* | 8/2011 | Hirata | G03B 21/20 |
| | | | | 353/31 |
| 2012/0104934 | A1* | 5/2012 | Fukai | F21S 48/1145 |
| | | | | 313/498 |
| 2012/0206900 | A1 | 8/2012 | Yang et al. | |

(Continued)

*Primary Examiner* — Steven Whitesell Gordon
*Assistant Examiner* — Jerry L Brooks
(74) *Attorney, Agent, or Firm* — JCIPRNET (57) ABSTRACT

The invention provides a projection apparatus and an illumination system. The projection apparatus includes an illumination system, a light valve, and a projection lens. The illumination system includes at least one laser light source, at least one light separating element, a wavelength conversion element, and a reflective element. The at least one laser light source is adapted to generate at least one laser beam, and the at least one laser beam is adapted to penetrate at least one first coating region of the light separating element. The wavelength conversion element is adapted to convert the laser beam from the light separating element into a converted beam. A second coating region of a reflective surface of the reflective element is adapted to reflect a portion of the laser beam from the wavelength conversion element, and the second coating region and the first coating region are adapted to reflect the converted beam. The portion of the laser beam and the converted beam constitute an illumination beam. In the projection apparatus and the illumination system of the invention, the converted beam may be more effectively used, so that the illumination system has good optical efficiency, and the projection apparatus has good imaging effects.

13 Claims, 8 Drawing Sheets

(56) References Cited

U.S. PATENT DOCUMENTS

2013/0194551 A1* 8/2013 Zhang ................... F21V 9/00
                                              353/31
2013/0229634 A1* 9/2013 Hu ...................... G03B 21/204
                                              353/84

* cited by examiner

PROJECTION APPARATUS AND ILLUMINATION SYSTEM

CROSS-REFERENCE TO RELATED APPLICATION

This application claims the priority benefit of China application serial no. 201611018066.9, filed on Nov. 18, 2016. The entirety of the above-mentioned patent application is hereby incorporated by reference herein and made a part of this specification.

BACKGROUND OF THE INVENTION

Field of the Invention

The invention relates to a display apparatus and an optical system, and particularly relates to a projection apparatus and an illumination system.

Description of Related Art

Recently, projection apparatuses featuring solid-state light sources such as light-emitting diodes (LEDs) and laser diodes have gradually become dominant in the market. Generally speaking, in a laser projection apparatus, imaging is performed by exciting phosphors through a laser provided by a laser light source. Also, the laser projection apparatus has the advantage of adjusting the number of light sources in response to the brightness requirements, so as to meet the requirements of projectors with various brightnesses. Thus, a projector architecture having the light source system using the laser light source has a great development potential.

At present, in an existing first kind of laser projector architecture, a blue light emitted from the light source system passes through holes of a reflective cover to be converged onto a phosphor wheel. A portion of the blue light excites phosphors on a rotating phosphor wheel to generate a yellow light, and the yellow light and another portion of the blue light which has not been excited together form an illumination beam of the laser projector architecture. However, the yellow light generated by exciting the phosphors may also leave the optical system through the holes of the reflective cover, and then may not be used subsequently. Thus, the laser projector will waste a portion of light energy, such that optical efficiency of the laser projector is decreased.

The description of related art merely serves to understand the invention and thus may include information unknown to people having ordinary skill in the art. What is disclosed in this paragraph does not indicate that the issues to be resolved in one or more embodiments of the invention are already known to or understood by people having ordinary skill in the art before the subject application is filed.

SUMMARY OF THE INVENTION

The invention provides a projection apparatus having good imaging effects.

The invention provides an illumination system having good optical efficiency.

Other objectives and advantages of the invention can be further illustrated by the technical features broadly embodied and described as follows.

To achieve one, a part, or all of the above advantages or other advantages, an embodiment of the invention provides a projection apparatus including an illumination system, a light valve, and a projection lens. The illumination system includes at least one laser light source, at least one light separating element, a wavelength conversion element, and a reflective element. The at least one laser light source is adapted to generate at least one laser beam. The at least one light separating element is located on a transmission path of the at least one laser beam from the at least one laser light source, and has at least one first coating region. The at least one laser light source corresponds to the at least one light separating element, and the at least one laser beam is adapted to penetrate the at least one first coating region. The wavelength conversion element is located on a transmission path of the at least one laser beam from the at least one light separating element, and adapted to convert a portion of the at least one laser beam into a converted beam. The reflective element is disposed between the at least one laser light source and the wavelength conversion element, and has a reflective surface facing the wavelength conversion element. The reflective surface has a second coating region, and the second coating region is adapted to reflect the portion of the at least one laser beam from the wavelength conversion element. The second coating region and the at least one first coating region are adapted to reflect the converted beam, and the portion of the at least one laser beam and the converted beam constitute an illumination beam. The light valve is disposed on a transmission path of the illumination beam, and adapted to convert the illumination beam into an image beam. The projection lens is disposed on a transmission path of the image beam.

To achieve one, a part, or all of the above advantages or other advantages, an embodiment of the invention provides an illumination system including at least one laser light source, at least one light separating element, a wavelength conversion element, and a reflective element. The at least one laser light source is adapted to generate at least one laser beam. The at least one light separating element is located on a transmission path of the at least one laser beam from the at least one laser light source, and has at least one first coating region. The at least one laser light source corresponds to the at least one light separating element, and the at least one laser beam is adapted to penetrate the at least one first coating region. The wavelength conversion element is located on a transmission path of the at least one laser beam from the at least one light separating element, and adapted to convert a portion of the at least one laser beam into a converted beam. The reflective element is disposed between the at least one laser light source and the wavelength conversion element, and has a reflective surface facing the wavelength conversion element. The reflective surface has a second coating region, and the second coating region is adapted to reflect the portion of the at least one laser beam from the wavelength conversion element. The second coating region and the at least one first coating region are adapted to reflect the converted beam, and the portion of the at least one laser beam and the converted beam constitute an illumination beam.

To achieve one, a part, or all of the above advantages or other advantages, an embodiment of the invention provides an illumination system including at least one solid-state light source, at least one light separating element, a wavelength conversion element, and a reflective element. The at least one solid-state light source is adapted to generate at least one emission beam. The at least one light separating element is located on a transmission path of the at least one emission beam from the at least one solid-state light source, and has at least one first coating region. The at least one solid-state light source corresponds to the at least one light separating element, and the at least one emission beam is adapted to penetrate the at least one first coating region. The wavelength conversion element is located on a transmission path of the at least one emission beam from the at least one light separating element, and adapted to convert a portion of the at least one emission beam into a converted beam. The reflective element is disposed between the at least one solid-state light source and the wavelength conversion element, and has a reflective surface facing the wavelength conversion element. The reflective surface has a second coating region, and the second coating region is adapted to reflect the portion of the at least one emission beam from the wavelength conversion element. The second coating region and the at least one first coating region are adapted to reflect the converted beam, and the portion of the at least one emission beam and the converted beam constitute an illumination beam.

Based on the above, the embodiments of the invention may achieve at least one of advantages or effects as listed below. In the projection apparatus and the illumination system of the embodiments of the invention, the at least one light separating element is located on the transmission path of the at least one laser beam from the at least one laser light source, and the wavelength conversion element is adapted to convert the portion of the at least one laser beam into the converted beam. Additionally, in the projection apparatus and the illumination system of the embodiments of the invention, the second coating region of the reflective surface facing the wavelength conversion element in the reflective element is adapted to reflect the portion of the at least one laser beam from the wavelength conversion element, and the second coating region and the at least one first coating region are adapted to reflect the converted beam. Thus, in the projection apparatus and the illumination system of the embodiments of the invention, the at least one laser beam may be transmitted to the wavelength conversion element by penetrating the at least one first coating region of the at least one light separating element, and the converted beam may not return to the at least one first coating region of the at least one light separating element. In the projection apparatus and the illumination system of the embodiments of the invention, the converted beam may be more effectively used, so that the illumination system has good optical effects, and the projection apparatus has good imaging effects.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
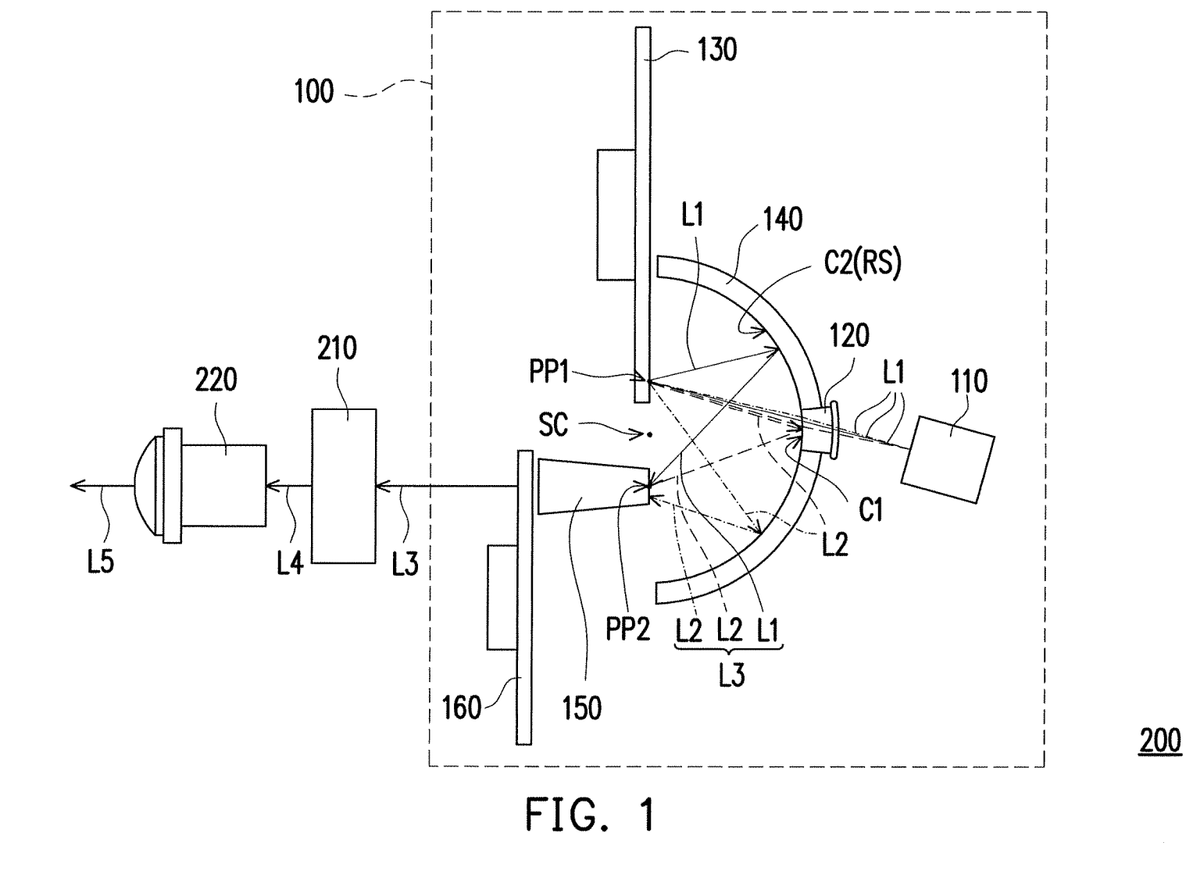
FIG. 1 is a schematic architecture view illustrating a projection apparatus according to an embodiment of the invention.

FIG. 1 is a schematic architecture view illustrating a projection apparatus according to an embodiment of the invention. Referring to FIG. 1, in the embodiment, a projection apparatus 200 includes an illumination system 100, a light valve 210, and a projection lens 220. The illumination system 100 includes at least one laser light source 110, at least one light separating element 120, a wavelength conversion element 130, and a reflective element 140. The at least one laser light source 110 is adapted to generate at least one laser beam L1. Particularly, the illumination system 100 of the embodiment includes one laser light source 110, and the laser light source 110 is a semiconductor laser light source. For instance, the laser light source 110 includes a laser diode, and the laser light source 110 is a blue laser diode array, for example. Additionally, the laser light source 110 generates the laser beam L1, and the laser beam L1 is a blue laser beam, for example. The invention is not limited thereto. However, the aforementioned laser light source 110 is illustrated as an example. In other embodiments, the light source in the illumination system 100 may also be other appropriate solid-state light source, such as a light emitting diode. More particularly, in other embodiments, the light emitting diode emitting a blue emission beam may also be used to replace the laser light source 110. The invention is not limited thereto.

Generally speaking, in an embodiment, at least one solid-state light source (e.g., the laser light source 100) is adapted to generate at least one emission beam (e.g., the laser beam L1). The at least one light separating element 120 is located on a transmission path of the at least one emission beam from the at least one solid-state light source. The at least one solid-state light source corresponds to the at least one light separating element 120, and the at least one emission beam is adapted to penetrate at least one first coating region (the details are described below). The wavelength conversion element 130 is located on a transmission path of the at least one emission beam from the at least one light separating element 120 and adapted to convert a portion of the at least one emission beam into a converted beam (the details are described below). The reflective element 140 is disposed between the at least one solid-state light source and the wavelength conversion element 130. A second coating region (the details are described below) is adapted to reflect the portion of the at least one emission beam from the wavelength conversion element 130, and the portion of the at least one emission beam and the converted beam constitute an illumination beam (the details are described below).

As mentioned above, particularly, in the embodiment, the at least one light separating element 120 is located on the transmission path of the at least one laser beam L1 from the at least one laser light source 110, and the at least one laser light source 110 corresponds to the at least one light separating element 120. Additionally, the at least one light separating element 120 has at least one first coating region C1, and the at least one laser beam L1 is adapted to penetrate the at least one first coating region C1. In the embodiment, a material of the light separating element 120 may include glass or plastics. The first coating region C1 is a coating film formed on glass or plastics, for example, and a coating material of the first coating region C1 may be a dielectric material. However, the invention is not limited thereto. More particularly, the light separating element 120 is a dichroic mirror, for example. However, the invention is not limited thereto.

Particularly, the illumination system 100 of the embodiment includes one light separating element 120. The light separating element 120 is located on the transmission path of the laser beam L1 from the laser light source 110. The laser light source 110 corresponds to the light separating element 120. In the embodiment, the light separating element 120 is disposed between the laser light source 110 and the wavelength conversion element 130. Additionally, in the embodiment, the light separating element 120 has the first coating region C1, and the laser beam L1 is adapted to penetrate the first coating region C1 so as to be transmitted to the wavelength conversion element 130. In the embodiment, when the laser beam L1 passes through the first coating region C1, beam shrinkage is performed on the laser beam L1 by the light separating element 120, for example, so that the laser beam L1 is converged onto the wavelength conversion element 130. However, in other embodiments, it may be provided with an appropriate optical element (e.g., lens or lens group, but the invention is not limited thereto) at an appropriate position (e.g., between the laser light source 110 and the light separating element 120, but the invention is not limited thereto) in the illumination system to perform the beam shrinkage on the laser beam L1, such that the laser beam L1 has been beam-shrunk before passing through the light separating element 120. The invention is not limited thereto.

In the embodiment, the wavelength conversion element 130 is located on a transmission path of the at least one laser beam L1 from the at least one light separating element 120 and adapted to convert a portion of the at least one laser beam L1 into a converted beam L2. The reflective element 140 is disposed between the at least one laser light source 110 and the wavelength conversion element 130 and has a reflective surface RS facing the wavelength conversion element 130. Additionally, the reflective surface RS has a second coating region C2. Particularly, the wavelength conversion element 130 is located on the transmission path of the laser beam L1 from the light separating element 120 and adapted to convert the portion of the at least one laser beam L1 into the converted beam L2. Additionally, in an embodiment, the wavelength conversion element 130 may also reflect a portion of the at least one laser beam L1.

In the embodiment, the second coating region C2 is a coating film formed on metal, a dielectric material, glass, or plastics, for example. A coating material of the second coating region C2 may be metal or a dielectric material, wherein a material of the metal coating may be silver, aluminum, or other appropriate metal. However, the invention is not limited thereto.

Figure 2A:
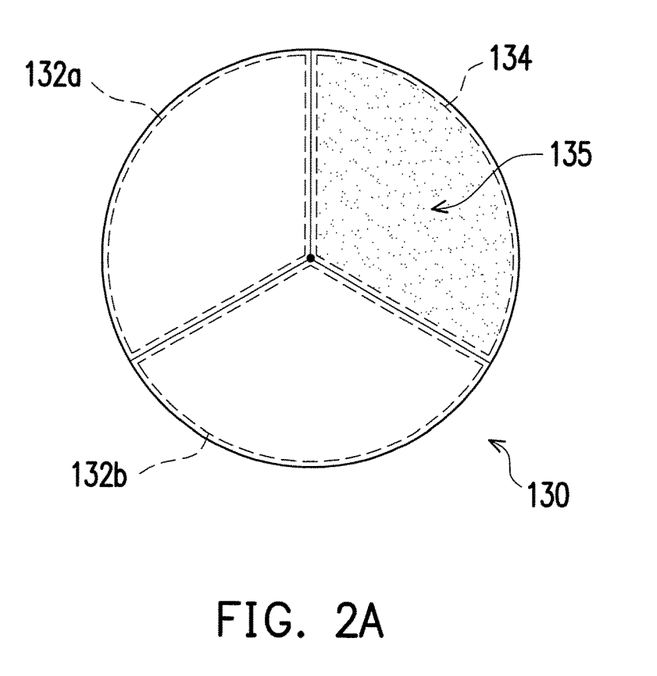
FIG. 2A is a schematic front view illustrating a wavelength conversion element of the embodiment of FIG. 1.

FIG. 2A is a schematic front view illustrating a wavelength conversion element of the embodiment of FIG. 1. Referring to FIG. 1 and FIG. 2A, in the embodiment, the wavelength conversion element 130 of the illumination system 100 includes at least one wavelength conversion regions 132a and 132b and a wavelength reserved region 134, and the at least one wavelength conversion region and the wavelength reserved region 134 are adapted to alternately move on the transmission path of the at least one laser beam L1. In an embodiment, when the at least one wavelength conversion regions 132a and 132b move on/to the transmission path of the at least one laser beam L1, the at least one laser beam L1 is converted into the converted beam L2 by the at least one wavelength conversion regions 132a and 132b. Particularly, in the embodiment, the wavelength conversion element 130 is a wavelength conversion wheel, such as a phosphor wheel or a fluorescence wheel. For instance, a phosphor layer or a fluorescence layer is coated on a substrate, but the invention is not limited thereto. In the embodiment, the wavelength conversion element 130 includes the wavelength conversion region 132a, the wavelength conversion region 132b, and the wavelength reserved region 134. In the embodiment, the wavelength conversion element 130 is used for rotation, such that the wavelength conversion region 132a, the wavelength conversion region 132b, and the wavelength reserved region 134 alternately move on the transmission path of the laser beam L1. In the embodiment, when the wavelength conversion region 132a or the wavelength conversion region 132b moves on the transmission path of the laser beam L1, the laser beam L1 is converted into the converted beam L2 by the wavelength conversion region 132a or the wavelength conversion region 132b, and the converted beam L2 is transmitted to the reflective surface RS of the reflective element 140. Additionally, in the embodiment, when the wavelength reserved region 134 moves on the transmission path of the laser beam L1, the wavelength reserved region 134 is adapted to guide the laser beam L1 to the reflective surface RS of the reflective element 140. In the embodiment, a wavelength of the converted beam L2 is different from a wavelength of the laser beam L1, for example. Additionally, in the embodiment, a wavelength (e.g., blue wavelength) of the laser beam L1 which has not been transmitted to the wavelength reserved region 134 is substantially equal to a wavelength (e.g., blue wavelength) of the laser beam L1 reflected to the reflective element 140 by the wavelength reserved region 134.

Specifically, referring to FIG. 1 and FIG. 2A, the wavelength conversion region 132a and the wavelength conversion region 132b are respectively a red wavelength conversion region and a green wavelength conversion region, for example. However, the invention is not limited thereto. In the embodiment, when the red wavelength conversion region (e.g., the wavelength conversion region 132a) moves on the laser beam L1, the laser beam L1 is converted into the converted beam L2 in red by the red wavelength conversion region. In the embodiment, when the green wavelength conversion region (e.g., the wavelength conversion region 132b) moves on the laser beam L1, the laser beam L1 is converted into the converted beam L2 in green by the green wavelength conversion region. In the embodiment, each of the wavelength conversion regions 132a and 132b includes a reflective plate and a phosphor layer (not shown) disposed on the reflective plate (not shown). In the embodiment, the laser beam L1 is excited by the phosphor layer to generate the converted beam L2, and the converted beam L2 is transmitted to the reflective surface RS of the reflective element 140. Particularly, in the embodiment, a color of the converted beam L2 converted by the phosphor layer in the wavelength conversion regions 132a and 132b is different from a color of the laser beam L1. For instance, the color of the laser beam L1 is blue, for example. The color of the converted beam L2 converted by the phosphor layer in the red wavelength conversion region (e.g., the wavelength conversion region 132a) is red, for example, and the color of the converted beam L2 converted by the phosphor layer in the green wavelength conversion region (e.g., the wavelength conversion region 132b) is green, for example: In other embodiments, the wavelength conversion element 130 may also convert the laser beam L1 into the converted beam L2 having other colors. For instance, in some embodiments, the wavelength conversion element 130 includes a wavelength conversion region which may convert the laser beam L1 into the converted beam L2 in yellow. The invention is not limited thereto.

As mentioned above, in the embodiment, the first coating region C1 of the light separating element 120 has wavelength selectivity for the passing of the beam. For instance, in some embodiments, the laser beam L1 is a blue light, for example, and the converted beam L2 is a yellow light, for example. However, the invention is not limited thereto. The first coating region C1 of the light separating element 120 of the embodiments has the selectivity for the blue wavelength, for example, such that the light having a wavelength other than the blue wavelength (e.g., the converted beam L2 in yellow) may not pass through the first coating region C1. Thus, the converted beam L2 will not penetrate the first coating region C1 of the light separating element 120, but will be reflected by the first coating region C1 of the light separating element 120. Therefore, the use efficiency of the converted beam L2 may be significantly improved in the embodiment. Thereby, the illumination system has good light utilization efficiency and the projection apparatus has good imaging effects. However, in other embodiments, the first coating region C1 may have the selectivity for other color light wavelength in response to the design requirements, so that the light having the wavelength other than the color light wavelength may not pass through the first coating region C1, but the invention is not limited thereto.

In the embodiment, the illumination system 100 further includes a light homogenizing element 150. In the embodiment, the light homogenizing element 150 is a light integration rod, for example, and the light integration rod may be a solid integration rod or a hollow integration rod. However, the invention is not limited thereto. Particularly, in the embodiment, the laser beam L1 is transmitted to the wavelength conversion element 130 by penetrating the first coating region C1 of the light separating element 120. Additionally, in the embodiment, the converted beam L2 generated from the laser beam L1 wavelength-converted by the wavelength conversion element 130 is reflected by the first coating region C1 and the second coating region C2 to be converged to the light homogenizing element 150. Additionally, in the embodiment, the laser beam L1 which has not been wavelength-converted by the wavelength conversion element 130 may be guided to the reflective surface RS of the wavelength conversion element 130 by the wavelength reserved region 134, and the laser beam L1 which has not been wavelength-converted by the wavelength conversion element 130 may be reflected by the reflective surface RS, so as to be converged to the light homogenizing element 150. Particularly, in the embodiment, the laser beam L1 converged to the light homogenizing element 150 and the converted beam L2 constitute an illumination beam L3. In the embodiment, the light homogenizing element 150 is located on a transmission path of the illumination beam L3 and adapted to homogenize light intensity/brightness distribution of the illumination beam L3. For instance, the light homogenizing element 150 is a light integration rod, for example. However, in some embodiments, the light homogenizing element 150 may also be other optical elements. The invention is not limited thereto.

Continuing to refer to FIG. 1, in the embodiment, the illumination system 100 further includes an optical adjustment element 160. The optical adjustment element 160 is disposed on a transmission path of the illumination beam L3. Particularly, the optical adjustment element 160 includes a filter wheel, for example, and is adapted to adjust a wavelength of the illumination beam L3. In the embodiment, the filter wheel includes a plurality of filter regions. Also, the filter wheel is used for rotation, so that the filter regions alternately move on the transmission path of the illumination beam L3 and filter out the color light corresponding to the filter regions. For instance, the filter wheel includes a red filter region, a green filter region, a blue filter region, or other color filter regions, for example. When the red filter region moves on the transmission path of the illumination beam L3, the red filter region may filter out the portion in the illumination beam L3 other than the red wavelength. In the embodiment, after the illumination beam L3 passes through the red filter region, the illumination beam L3 will appear red. Additionally, the function of other color filter region is similar to that of the red filter region, and will not be repeated. From the above, color purity of the illumination beam L3 may be adjusted by setting the filter wheel in the embodiment, thereby improving optical quality of the illumination system 100 and imaging quality of the projection apparatus 200. In addition, in other embodiments, the optical adjustment element 160 may also include an appropriate optical element adapted to adjust spectral full-width-at-half-maximum of the illumination beam L3, so as to adjust the color purity of the illumination beam L3. The invention is not limited thereto.

In the embodiment, the light valve 210 of the projection apparatus 200 is disposed on the transmission path of the illumination beam L3 and adapted to convert the illumination beam L3 into an image beam L4. Additionally, the projection lens 220 is disposed on a transmission path of the image beam L4 and projects a projection beam L5. In the embodiment, the projection beam L5 may be projected onto a projection surface, a wall surface, or a screen (not shown) to form an image screen, but the invention does not limit the imaging position or imaging form of the projection beam L5. In the embodiment, the light valve 210 is a digital micro-minor device (DMD), or a liquid-crystal-on-silicon panel (LCOS panel), for example. However, in other embodiments, the light valve 210 may also be a transparent liquid crystal display panel (LCD panel), or other spatial light modulators, but the invention is not limited thereto.

As shown in FIG. 1, in the embodiment, a through hole is formed at a center of the reflective element 140, for example. The light separating element 120 is embedded in the through hole, such that the light separating element 120 and the reflective element 140 are combined with each other. Thereby, the light separating element 120 may be fixed at the center of the reflective element 140. However, the invention does not limit that the light separating element must be located at the center of the reflective element. The position of the light separating element/through hole may be decided depending on the design. In the embodiment, the first coating region C1 of the light separating element 120 and the second coating region C2 of the reflective element 140 together form a partial spherical surface SS. However, the technical means related to the embedding described above are illustrated as an example, and does not limit the invention. In some embodiments, the positions of the light separating element 120 and the reflective element 140 may also be fixed by an assembly fixture first, so that the first coating region C1 and the second coating region C2 having the same curvature (or radius of curvature) together form the partial spherical surface SS. Next, the light separating element 120 is fixed to the reflective element 140 by dispensing, and then the assembly fixture is removed. The invention is not limited thereto. Additionally, in some embodiments, the light separating element 120 and the reflective element 140 may be an integrated element, and the first coating region C1 and the second coating region C2 are formed by partition coating. The invention is not limited thereto. Particularly, in terms of the embodiment that the first coating region C1 and the second coating region C2 are made by partition coating, the manufacturing method that the light separating element 120 and the reflective element 140 are combined with each other of the embodiment of the invention is easier to make.

As mentioned above, referring to FIG. 1 and FIG. 2A to FIG. 2B, FIG. 2B is a schematic cross-sectional view illustrating a light guide structure of the wavelength conversion element of FIG. 2A. In the embodiment, when the wavelength reserved region 134 moves on the transmission path of the laser beam L1, the wavelength reserved region 134 is adapted to guide the laser beam L1 to the reflective surface RS of the reflective element 140. Particularly, in the embodiment, the wavelength reserved region 134 has a plurality of light guide structures 135, and the light guide structures 135 are adapted to guide the laser beam L1 transmitted to the wavelength reserved region 134 to the second coating region C2. Specifically, in the embodiment, a shape of each of the light guide structures 135 is a taper P, for example. However, the invention is not limited thereto. In the embodiment, each of the tapers P has a reflective surface RSP1 and a reflective surface RSP2, for example, and the laser beam L1 is reflected on the reflective surface RSP1 and the reflective surface RSP2 of the taper P to be transmitted toward the second coating region C2. That is, in the embodiment, the laser beam L1 after being reflected on the reflective surface RSP1 and the reflective surface RSP2 may avoid an original incident direction, so that it may not be transmitted toward the first coating region C1 substantially. Thus, the laser beam L1 which has been incident to the wavelength conversion element 130 is not easy to return to the light separating element 120, thereby improving the use efficiency of the laser beam L1.

Figure 2B:
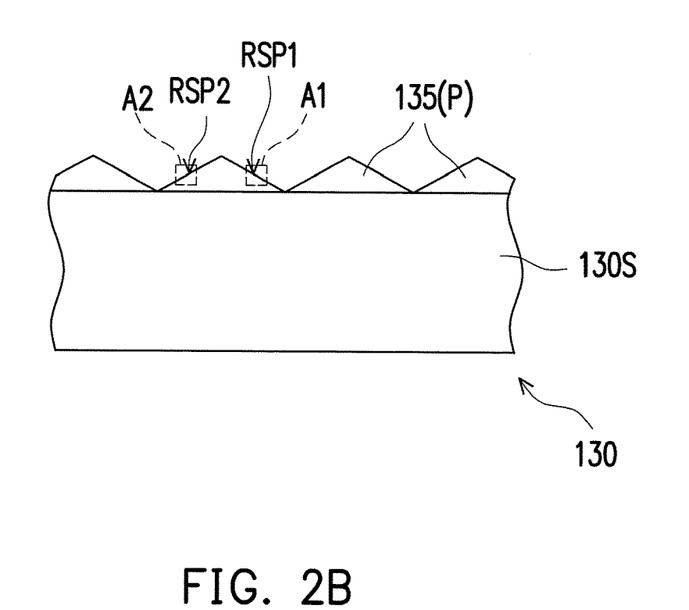
FIG. 2B is a schematic cross-sectional view illustrating a light guide structure of the wavelength conversion element of FIG. 2A.
Figure 2C:
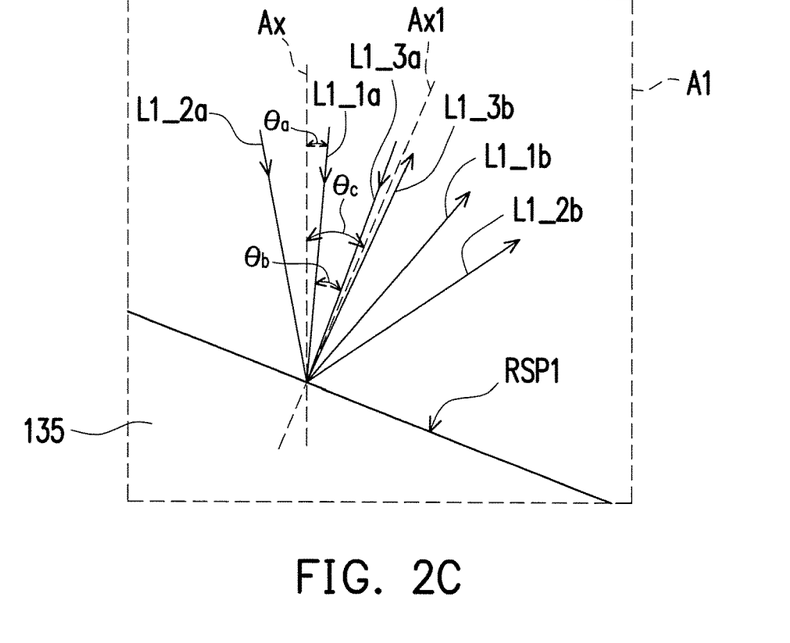
FIG. 2C is an enlarged schematic view illustrating an area A1 of FIG. 2B and a schematic light path view of a laser beam.
Figure 2D:
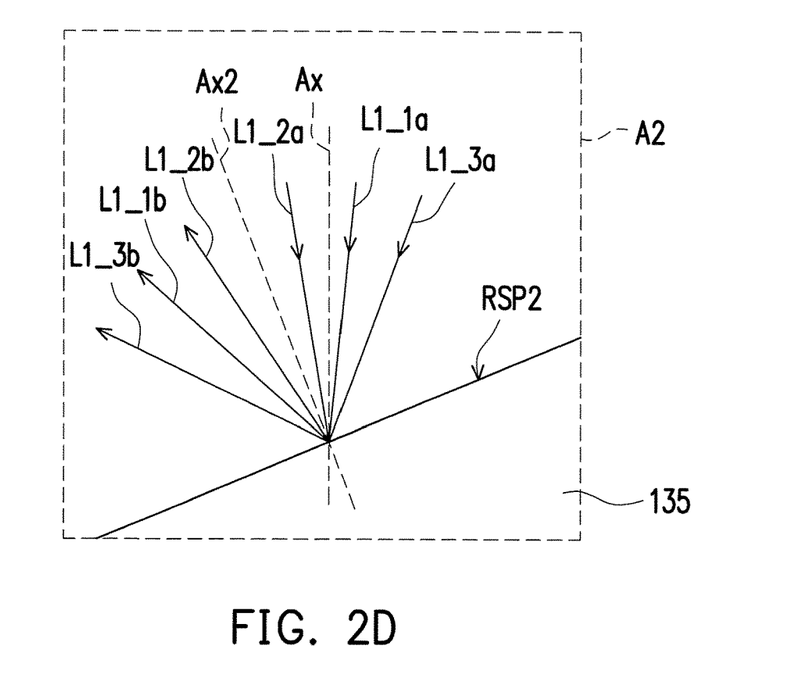
FIG. 2D is an enlarged schematic view illustrating an area A2 of FIG. 2B and a schematic light path view of a laser beam.

FIG. 2C is an enlarged schematic view illustrating an area A1 of FIG. 2B and a schematic light path view of a laser beam, and FIG. 2D is an enlarged schematic view illustrating an area A2 of FIG. 2B and a schematic light path view of a laser beam. Referring to FIG. 1 and FIG. 2C, in the embodiment, to clearly illustrate the light taper laser beam L1 formed from the beam shrinkage in FIG. 1, it is illustrated using a laser light L1_1a, a laser light L1_2a, and a laser light L1_3a in FIG. 2C, for example, wherein the laser light L1_1a in FIG. 2C is located on an optical axis direction of the laser beam L1 in FIG. 1, for example, and the laser beam L1 (the laser lights L1_1a, L1_2a, and L1_3a) is tilted incident to the reflective surface RSP1 of the light guide structure 135 of the wavelength conversion element 130 after being beam-shrunk by the light separating element 120 or other optical elements. Referring to FIG. 1 and FIG. 2B to FIG. 2C, in the embodiment, the laser light L1_1a incident toward the reflective surface RSP1 and a normal vector Ax of a substrate 130S of the wavelength conversion element 130 has an included angle $\theta_a$ therebetween. The laser light L1_1a incident to the reflective surface RSP1 and the laser light L1_3a incident toward the reflective surface RSP1 has an included angle $\theta_b$ (i.e., a half cone angle of the light taper laser beam L1 which is beam-shrunk). A normal vector Ax1 of the reflective surface RSP1 and the normal vector Ax of the substrate 130S has an included angle $\theta_c$. In the embodiment, when an appropriate included angle $\theta_c$ is used that the included angle $\theta_c$ is larger than a sum of the included angle $\theta_a$ and the included angle $\theta_b$ (i.e., $\theta_c > \theta_a + \theta_b$), the laser lights L1_1b, L1_2b, and L1_3b reflected by the reflective surface RSP1 may not be interfered with the laser lights L1_1a, L1_2a, and L1_3a incident to the reflective surface RSP1. That is, the light taper laser beam L1 reflected by the reflective surface RSP1 will not be interfered with the light taper laser beam L1 incident to the reflective surface RSP1. Thus, the laser beam L1 from the first coating region C1 after being reflected by the reflective surface RSP1 may be transmitted toward the second coating region C2 and is not easy to return to the first coating region C1.

Similarly, referring to FIG. 1 and FIG. 2D, in the embodiment, to clearly illustrate the light taper laser beam L1 formed from the beam shrinkage in FIG. 1, it is illustrated using the laser light L1_1a, the laser light L1_2a, and the laser light L1_3a in FIG. 2D, for example, wherein the laser light L1_1a in FIG. 2D is located on the optical axis direction of the laser beam L1 in FIG. 1, for example, and the laser beam L1 (the laser lights L1_1a, L1_2a, and L1_3a) is tilted incident to another reflective surface RSP2 of the light guide structure 135 of the wavelength conversion element 130 after being beam-shrunk by the light separating element 120 or other optical elements. In the embodiment, the reflective surface RSP2 has a normal vector Ax2. It may be seen from FIG. 2D, when the light guide structure 135 is disposed as FIG. 2C that takes appropriate included angles $\theta_a$, $\theta_b$ and $\theta_c$, such as the included angle $\theta_c$ is larger than the sum of the included angle $\theta_a$ and the included angle $\theta_b$ (i.e., $\theta_c > \theta_a + \theta_b$), the laser lights L1_1b, L1_2b, and L1_3b reflected by the reflective surface RSP2 may not be interfered with the laser lights L1_1a, L1_2a, and L1_3a incident to the reflective surface RSP2. That is, the light taper laser beam L1 reflected by the reflective surface RSP2 will not be interfered with the light taper laser beam L1 incident to the reflective surface RSP2. Thus, the laser beam L1 from the first coating region C1 after being reflected by the reflective surface RSP2 may be transmitted toward the second coating region C2 and is not easy to return to the first coating region C1. Referring to FIG. 1, FIG. 2C, and FIG. 2D, particularly, in the embodiment, the light guide structure 135 may guide the laser beam L1 (the laser lights L1_1b, L1_2b, and L1_3b) to be transmitted toward the second coating region C2, such that the laser beam L1 is not easy to return to the first coating region C1 of the light separating element 120, thereby improving the use efficiency of the laser beam L1.

In the embodiment, the aforementioned taper P is a cone (not shown), or a pyramid, for example, and a pitch of the light guide structures 135 is in a range of 0.5 micrometers (mm) to 1.5 mm, for example, but the invention is not limited thereto. However, in some embodiments, the light guide structures 135 may also have other pitches. Additionally, the light guide structures 135 may also have other structures, such as optical elements having an optical interference structure, an optical diffractive structure, or a grid structure, so as to guide the laser beam L1 which has been incident to the wavelength conversion element 130 to be not easy to return to the light separating element 120. The invention is not limited to the aforementioned optical elements. In the embodiment, the optical element having the optical diffractive structure is a diffractive optical element (DOE), for example. The grid structure is a grating (not shown), for example. The diffractive optical element/grid structure may be a one-dimensional structure, or may be a two-dimensional structure, so as to control the reflective form of the beam. More particularly, in the embodiment, the grid structure may be disposed at the incident surface of the wavelength conversion element 130. When the laser beam L1 reaches the incident surface of the wavelength conversion element 130, the interference may occur through the grid structure so as to achieve the purpose of reflecting the laser beam L1 toward a specific direction, but the invention is not limited thereto. However, in other embodiments, the taper P may also be a cylindrical/lenticular taper, such as a triangle cylinder, a circular cylinder (not shown), or a cylindrical array/lenticular array. However, the invention is not limited thereto.

Particularly, in the embodiment, the laser beam L1 is adapted to penetrate the first coating region C1 of the light separating element 120 so as to be transmitted to the wavelength conversion element 130, and the wavelength conversion element 130 is adapted to convert at least a portion of the laser beam L1 into the converted beam L2. Additionally, in the embodiment, the second coating region C2 of the reflective surface RS of the reflective element 140 facing the wavelength conversion element 130 is adapted to reflect the portion of the laser beam L1 from the wavelength conversion element 130, and the second coating region C2 and the first coating region C1 are adapted to reflect the converted beam L2. Thus, in the embodiment, the laser beam L1 and the converted beam L2 may be more effectively used, so that the projection apparatus 200 has good imaging effects and the illumination system 100 has good light utilization efficiency.

In the above embodiments, the wavelength reserved region 134 of the wavelength conversion element 130 has a plurality of the light guide structures 135 to change a direction of travel of the laser beam L1, for example. However, the invention does not limit that the light guide structure must be disposed in the wavelength conversion element. That is, in other embodiments, the wavelength reserved region 134 of the wavelength conversion element 130 may not be provided with the light guide structure 135.

Figure 3A:
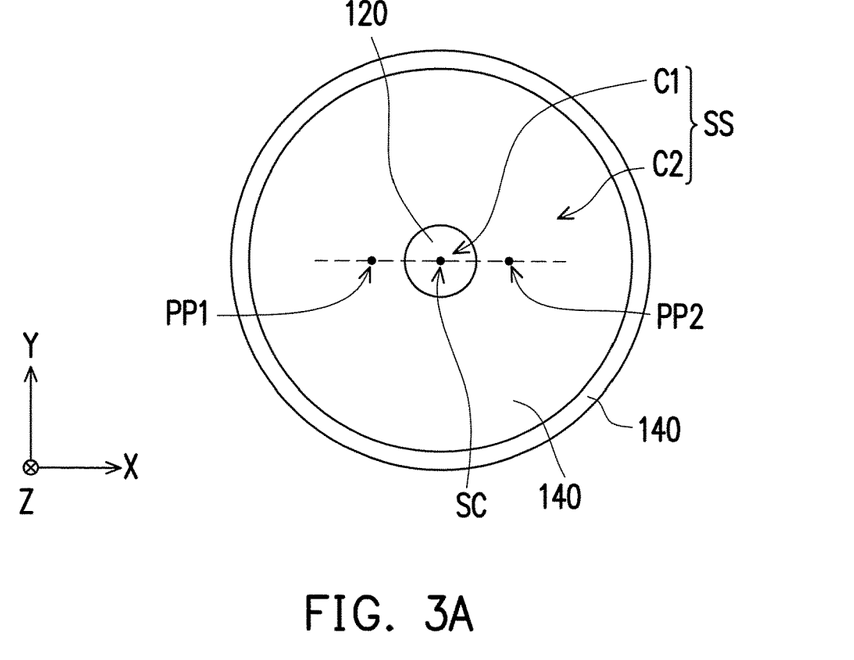
FIG. 3A is a schematic view illustrating a relationship between a light separating element and a reflective element of the embodiment of FIG. 1.
Figure 3B:
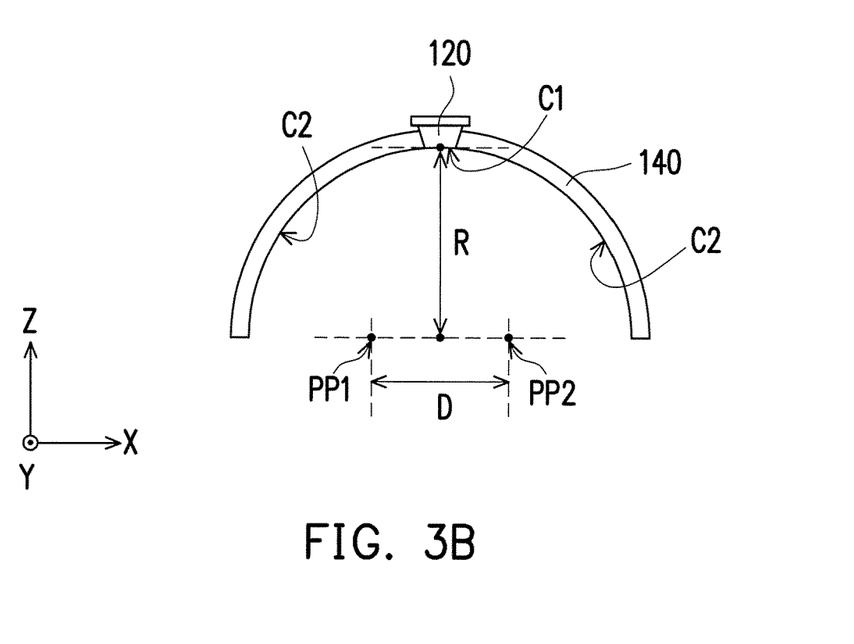
FIG. 3B is a schematic cross-sectional view illustrating the light separating element and the reflective element of the embodiment of FIG. 1.

FIG. 3A is a schematic view illustrating a relationship between a light separating element and a reflective element of the embodiment of FIG. 1, and FIG. 3B is a schematic cross-sectional view illustrating the light separating element and the reflective element of the embodiment of FIG. 1. Referring to FIG. 1 and FIG. 3A to FIG. 3B at the same time first, in the embodiment, the at least one first coating region C1 and the second coating region C2 together form the partial spherical surface. In the embodiment, the first coating region C1 of the light separating element 120 and the second coating region C2 of the reflective element 140 are continuously connected to together form the partial spherical surface SS. In the embodiment, the second coating region C2 is adapted to reflect the portion of the at least one laser beam L1 from the wavelength conversion element 130. The second coating region C2 and the at least one first coating region C1 are adapted to reflect the converted beam L2, and the converted beam L2 and the portion of the at least one laser beam L1 constitute the illumination beam L3. In simple terms, in the embodiment, from FIG. 1, the converted beam L2 from the first coating region C1 and the second coating region C2 and the portion of the laser beam L1 constitute the illumination beam L3.

Continuing to refer to FIG. 1 and FIG. 3A to FIG. 3B at the same time, in the embodiment, the first coating region C1 of the light separating element 120 and the second coating region C2 of the reflective element 140 together form the partial spherical surface SS. In the embodiment, the wavelength conversion element 130 is located on a first periapsis position PP1 of the partial spherical surface SS, and the light homogenizing element 150 is located on a second periapsis position PP2 of the partial spherical surface SS. In the embodiment, the position that located on the second periapsis position PP2 of the partial spherical surface SS is a light incident position of the light homogenizing element 150, but the invention is not limited thereto. Additionally, in the embodiment, a spherical center SC of the partial spherical surface SS is located between the first periapsis position PP1 and the second periapsis position PP2 (e.g. the spherical center SC is located at the position of the center/middle of the first periapsis position PP1 and the second periapsis position PP2), and located on a connecting line of the first periapsis position PP1 and the second periapsis position PP2. In the embodiment, the first periapsis position PP1 and the second periapsis position PP2 are symmetric to the spherical center SC of the partial spherical surface SS. In the embodiment, the spherical center SC of the partial spherical surface SS is located at the center of the first periapsis position PP1 and the second periapsis position PP2, for example. Particularly, the three-dimensional space constructed by a first axis X, a second axis Y, and a third axis Z is used as an example. In the embodiment, the connecting line of the first periapsis position PP1 and the second periapsis position PP2 is parallel to the first axis X. The first periapsis position PP1 and the second periapsis position PP2 has a distance D along a direction of the first axis X. A distance between the spherical center SC and the light separating element 120 along a direction of the third axis Z is R.

As mentioned above, referring to FIG. 1 and FIG. 3A to FIG. 3B at the same time, in the embodiment, the first periapsis position PP1 is close to the spherical center SC, and the second periapsis position PP2 is close to the spherical center SC. However, the invention is not limited thereto. In the embodiment, a light from the first periapsis position PP1 after being reflected by the partial spherical surface SS may be converged to the second periapsis position PP2 substantially. Particularly, in the embodiment, the laser beam L1 passing through the light separating element 120 after incident to the first periapsis position PP1 may be transmitted to the wavelength conversion element 130. Additionally, in the embodiment, the converted beam L2 and the laser beam L1 which has not been converted into the converted beam L2 by the wavelength conversion element 130 constitute the illumination beam L3, and the illumination beam L3 is reflected by the first coating region C1 and the second coating region C2 to be converged to the second periapsis position PP2 and enter the light homogenizing element 150. In the embodiment, since the wavelength conversion element 130 is disposed at the first periapsis position PP1 of the partial spherical surface SS and the light homogenizing element 150 is disposed at the second periapsis position PP2, the illumination beam L3 may be converged to the second periapsis position PP2 to incident to the light homogenizing element 150, but the invention is not limited thereto. However, in other embodiments, other appropriate optical elements may also be disposed at the second periapsis position PP2 according to the actual optical requirements, but the invention is not limited thereto. In the embodiment, the first periapsis position PP1 and the second periapsis position PP2 have a distance D therebetween, and a ratio of the distance D to a radius R of the partial spherical surface SS is between 0.1 and 0.3. In some embodiments, the ratio of the distance D to the radius R of the partial spherical surface SS may be between 0.1 and 0.2. However, in other embodiments, the first periapsis position PP1 and the second periapsis position PP2 may be set appropriately according to the actual optical requirements. The invention is not limited thereto.

In other embodiments, the light separating element 120 (or the first coating region C1 of the light separating element 120) may also be a polarizer having polarization selectivity for the passing of the beam. However, the invention is not limited thereto. More particularly, in other embodiments, the laser beam L1 provided by the laser light source 110 is a linear polarization light, for example. The light separating element 120 (or the first coating region C1 of the light separating element 120) is a linear polarizer, for example. The converted beam L2 formed from the laser beam L1 converted by the wavelength conversion regions 132a/132b of the wavelength conversion element 130 does not have polarization, for example, and the laser beam L1 after being reflected by the wavelength reserved region 134 may still have linear polarization or become to have no polarization. However, the above linear polarization characteristics is illustrated as an example. The invention does not limit the polarization characteristics of the laser beam and the light separating element. That is, the polarization characteristics of the laser beam and the light separating element may also be circular polarization or elliptical polarization.

Figure 4:
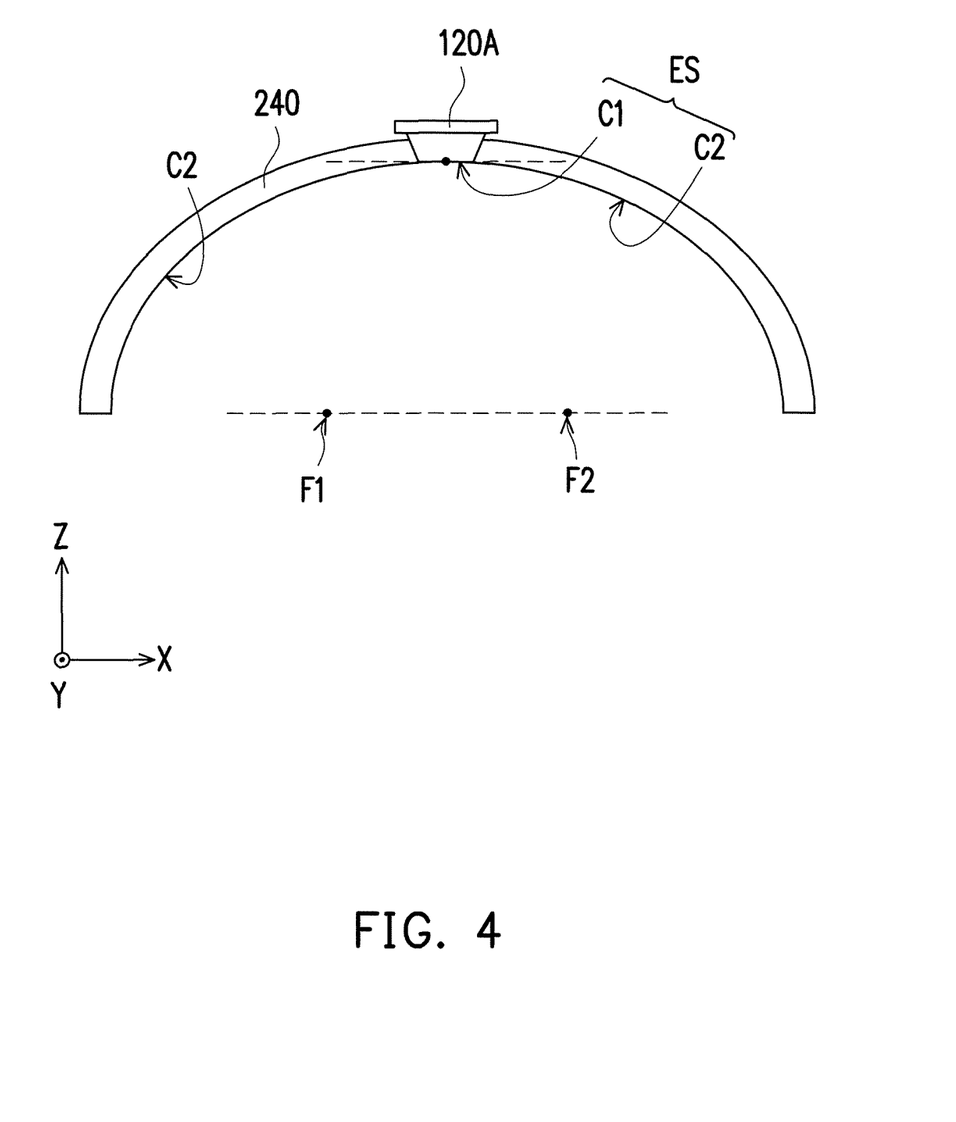
FIG. 4 is a schematic cross-sectional view illustrating the light separating element and the reflective element according to another embodiment of the invention.

In the above embodiments, the at least one first coating region C1 and the second coating region C2 together form the partial spherical surface, for example. However, in other embodiments, the at least one first coating region C1 and the second coating region C2 may also together form a partial elliptical surface, as shown in FIG. 4. FIG. 4 is a schematic cross-sectional view illustrating the light separating element and the reflective element according to another embodiment of the invention. Referring to FIG. 4, in the embodiment, a light separating element 120A and a reflective element 240 are similar to the light separating element 120 and the reflective element 140 of the embodiment of FIG. 3B. The related description of the light separating element 120A and the reflective element 240 may be referred to that of the light separating element 120 and the reflective element 140 respectively, and will not be repeated. The main differences between the light separating element 120A and the reflective element 240 and the light separating element 120 and the reflective element 140 are described as below. In the embodiment, the first coating region C1 and the second coating region C2 together form a partial elliptical surface ES, and the partial elliptical surface ES has a first focus F1 and a second focus F2. In the embodiment, as shown in FIG. 1 and FIG. 4, a light from the first focus F1 after being reflected by the partial elliptical surface ES may be converged to the second focus F2 substantially. More particularly, in the embodiment, the wavelength conversion element 130 is located on the first focus F1 of the partial elliptical surface ES. Thus, the laser beam L1 passing through the light separating element 120 after incident to the first focus F1 may be transmitted to the wavelength conversion element 130. The illumination beam L3 is reflected by the first coating region C1 and the second coating region C2 to be converged to the second focus F2. In the embodiment, the second focus F2 of the partial elliptical surface ES may be further provided with the light homogenizing element 150, such that the illumination beam L3 reflected by the first coating region C1 and the second coating region C2 after being converged to the second focus F2 may enter the light homogenizing element 150. However, the invention is not limited thereto. In the embodiment, since the wavelength conversion element 130 is disposed at the first focus F1 of the partial elliptical surface ES and the light homogenizing element 150 is disposed at the second focus F2, the illumination beam L3 may be converged to the second focus F2 to incident to the light homogenizing element 150, but the invention is not limited thereto. However, in other embodiments, other appropriate optical elements may also be disposed at the second focus F2 according to the actual optical requirements, but the invention is not limited thereto. Additionally, from FIG. 4, in the embodiment, the first focus F1 and the second focus F2 are located on a long axis of the partial elliptical surface ES, for example, and the light separating element 120A is located on a short axis of the partial elliptical surface ES, for example. A ratio of a distance between the first focus F1 and the second focus F2 to the short axis of the partial elliptical surface ES is between 0.1 and 0.4. However, in other embodiments, the first periapsis position PP1 and the second periapsis position PP2 may be set appropriately according to the actual optical requirements. The invention is not limited thereto.

In the above embodiments, as shown in FIG. 1, FIG. 3A to FIG. 3B, and FIG. 4, the quantity of the first coating region C1 is one, for example, and the second coating region C2 (or the reflective surface RS) surrounds the first coating region C1, for example. However, the set position of the first coating region C1 relative to the second coating region C2 (the reflective surface RS) is not limited to the above embodiment.

Figure 5:
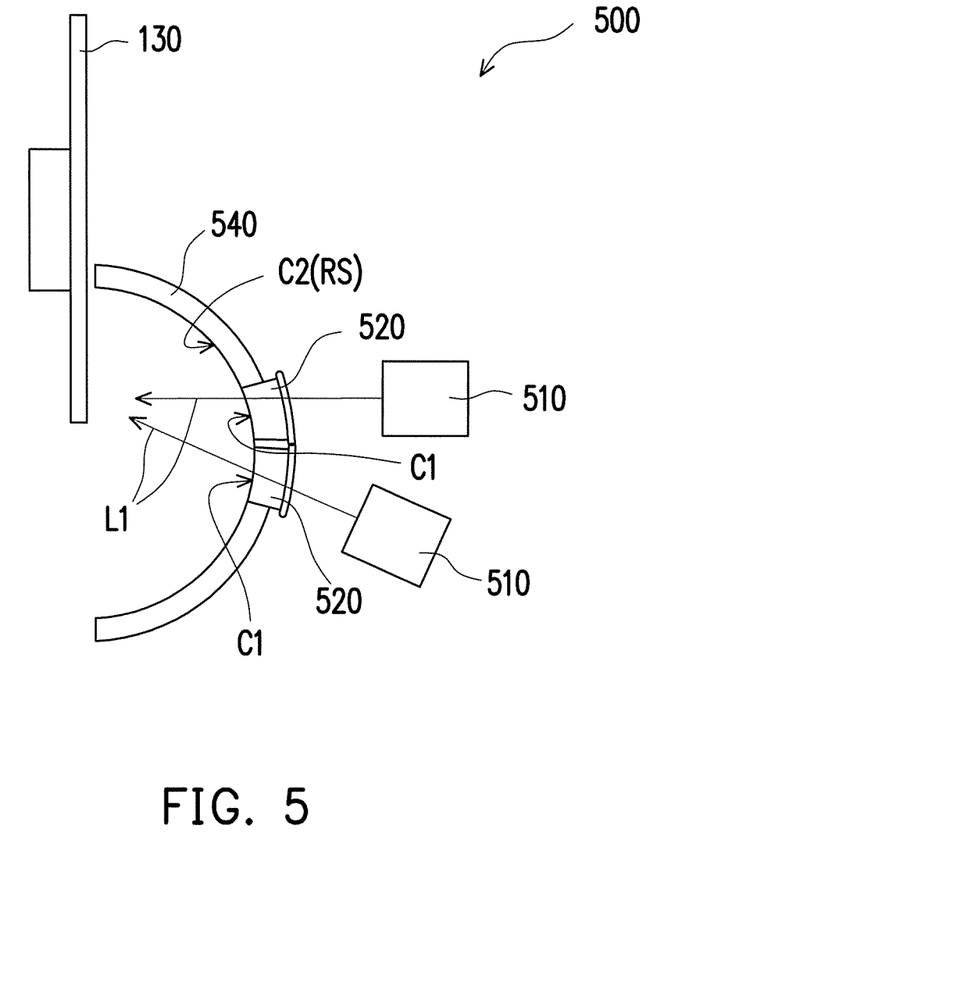
FIG. 5 is a schematic architecture view illustrating an illumination system according to another embodiment of the invention.

In other embodiments, the first coating region C1 may be multiple, as shown in FIG. 5. FIG. 5 is a schematic architecture view illustrating an illumination system according to another embodiment of the invention. In the embodiment, an illumination system 500 is similar to the illumination system 100 of the embodiment of FIG. 1. The components and the related description of the illumination system 500 may be referred to that of the illumination system 100 of the embodiment of FIG. 1, and will not be repeated. The main difference between the illumination system 500 and the illumination system 100 is described as below. In the embodiment, at least one laser light source 510 of the illumination system 500 is a plurality of laser light sources 510. The at least one first coating region C1 is a plurality of first coating regions C1, and the first coating regions C1 respectively correspond to the laser light sources 510. Particularly, in the embodiment, the illumination system 500 includes a plurality of light separating elements 520 combined with a reflective element 540, and each of the light separating elements 520 has one first coating region C1, for example. Each of the first coating regions C1 corresponds to one laser light source 510, for example. In the embodiment, two first coating regions C1 shown in FIG. 5 are connected to each other, for example, but the invention is not limited thereto. In other embodiments, the plurality of the first coating regions C1 may not be connected to each other, but the invention is not limited thereto. Alternatively, in some embodiments, a portion of the plurality of the first coating regions C1 may be set to be connected to each other and another portion of the plurality of the first coating regions C1 may be set to be unconnected to each other according to the actual requirements. The invention is not limited thereto.

Figure 6:
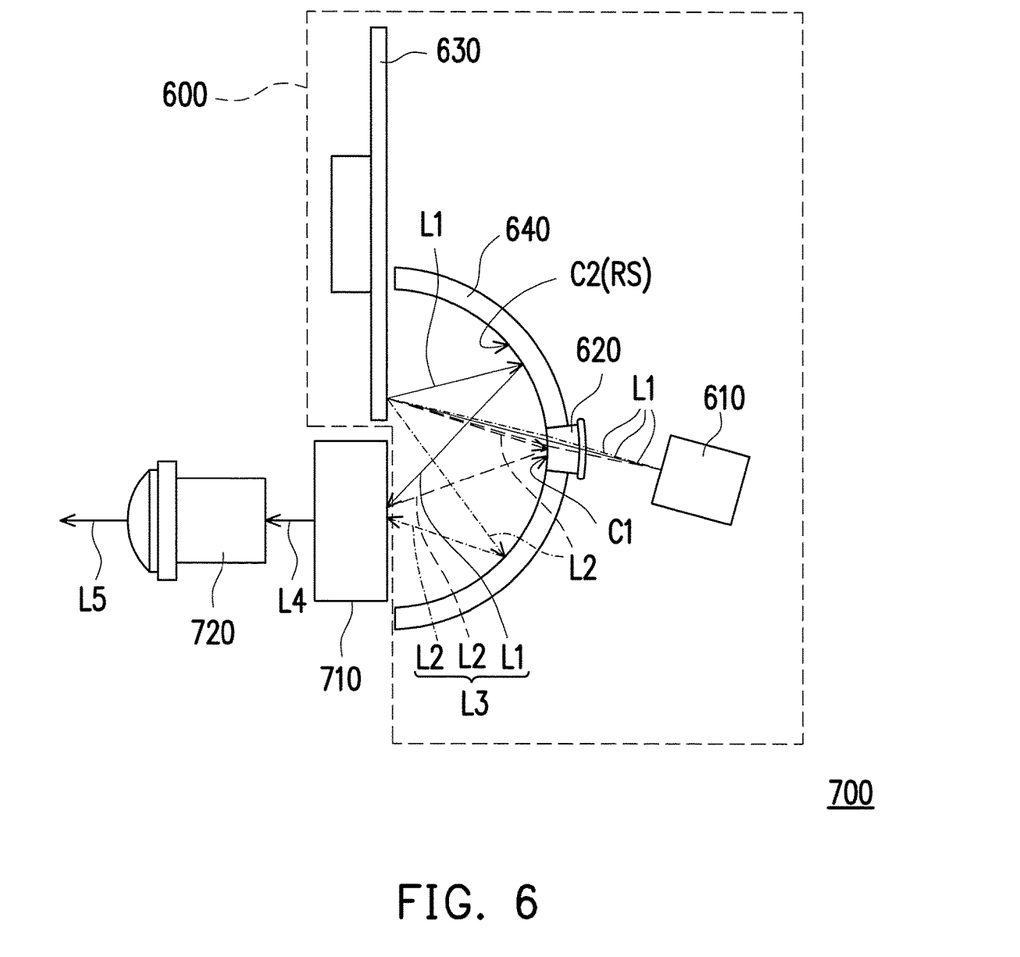
FIG. 6 is a schematic architecture view illustrating a projection apparatus according to yet another embodiment of the invention.

FIG. 6 is a schematic architecture view illustrating a projection apparatus according to yet another embodiment of the invention. Referring to FIG. 6, in the embodiment, a projection apparatus 700 includes an illumination system 600, a light valve 710, and a projection lens 720. The illumination system 600 includes at least one laser light source 610, at least one light separating element 620, a wavelength conversion element 630, and a reflective element 640. The at least one laser light source 610 is adapted to generate at least one laser beam L1. The at least one light separating element 620 is located on a transmission path of the at least one laser beam L1 from the at least one laser light source 610 and has at least one first coating region C1. The at least one laser light source 610 corresponds to the at least one light separating element 620, and the at least one laser beam L1 is adapted to penetrate the at least one first coating region C1. Additionally, the wavelength conversion element 630 is located on a transmission path of the at least one laser beam L1 from the at least one light separating element 620 and adapted to convert at least a portion of the at least one laser beam L1 into the converted beam L2. The reflective element 640 is disposed between the at least one laser light source 610 and the wavelength conversion element 630 and has the reflective surface RS facing the wavelength conversion element 630. The reflective surface RS has the second coating region C2, and the second coating region C2 is adapted to reflect the portion of the at least one laser beam L1 from the wavelength conversion element 630. The second coating region C2 and the at least one first coating region C1 are adapted to reflect the converted beam L2, and the portion of the at least one laser beam L1 and the converted beam L2 constitute the illumination beam L3. Additionally, the light valve 710 is disposed on a transmission path of the illumination beam L3 and adapted to convert the illumination beam L3 into the image beam L4. Additionally, the projection lens 720 is disposed on a transmission path of the image beam L4. In the embodiment, the projection lens 720 projects the projection beam L5. Particularly, the sufficient teachings, advices, and implementation instructions about the related description of the components of the projection apparatus 700 of the embodiment of the invention may be obtained from the descriptions of the embodiments of FIG. 1 to FIG. 5, and will not be repeated.

Figure 7:
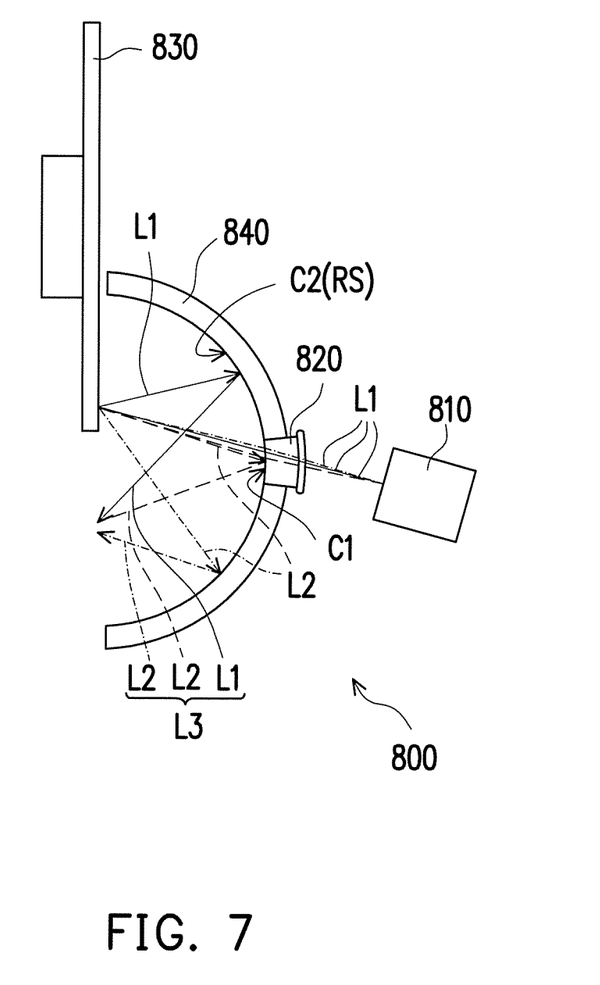
FIG. 7 is a schematic architecture view illustrating an illumination system according to yet another embodiment of the invention.

FIG. 7 is a schematic architecture view illustrating an illumination system according to yet another embodiment of the invention. Referring to FIG. 7, in the embodiment, an illumination system 800 includes at least one laser light source 810, at least one light separating element 820, a wavelength conversion element 830, and a reflective element 840. The at least one laser light source 810 is adapted to generate at least one laser beam L1. The at least one light separating element 820 is located on a transmission path of the at least one laser beam L1 from the at least one laser light source 810 and has at least one first coating region C1. The at least one laser light source 810 corresponds to the at least one light separating element 820, and the at least one laser beam L1 is adapted to penetrate the at least one first coating region C1. Additionally, the wavelength conversion element 830 is located on a transmission path of the at least one laser beam L1 from the at least one light separating element 820 and adapted to convert at least a portion of the at least one laser beam L1 into the converted beam L2. The reflective element 840 is disposed between the at least one laser light source 810 and the wavelength conversion element 830 and has the reflective surface RS facing the wavelength conversion element 830. The reflective surface RS has the second coating region C2, and the second coating region C2 is adapted to reflect the portion of the at least one laser beam L1 from the wavelength conversion element 830. The second coating region C2 and the at least one first coating region C1 are adapted to reflect the converted beam L2, and the portion of the at least one laser beam L1 and the converted beam L2 constitute the illumination beam L3. Particularly, the sufficient teachings, advices, and implementation instructions about the related description of the components of the illumination system 800 of the embodiment of the invention may be obtained from the descriptions of the embodiments of FIG. 1 to FIG. 5, and will not be repeated.

In summary, in the projection apparatus and the illumination system of the embodiments of the invention, the at least one light separating element is located on the transmission path of the at least one laser beam from the at least one laser light source, and the wavelength conversion element is adapted to convert at least the portion of the at least one laser beam into the converted beam. Additionally, in the projection apparatus and the illumination system of the embodiments of the invention, the second coating region of the reflective surface facing the wavelength conversion element in the reflective element is adapted to reflect the portion of the at least one laser beam from the wavelength conversion element, and the second coating region and the at least one first coating region are adapted to reflect the converted beam. Thus, in the projection apparatus and the illumination system of the embodiments of the invention, the at least one laser beam may be transmitted to the wavelength conversion element by penetrating the at least one first coating region of the at least one light separating element, and the converted beam may not return to the at least one first coating region of the at least one light separating element. In the projection apparatus and the illumination system of the embodiments of the invention, the converted beam may be more effectively used, so that the illumination system has good optical efficiency, and the projection apparatus has good imaging effects.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection apparatus, comprising:
   an illumination system, comprising:
      at least one laser light source, adapted to generate at least one laser beam;
      at least one light separating element, located on a transmission path of the at least one laser beam from the at least one laser light source, and having at least one first coating region, wherein the at least one laser light source corresponds to the at least one light separating element, and the at least one laser beam is adapted to penetrate the at least one first coating region;
      a wavelength conversion element, located on a transmission path of the at least one laser beam from the at least one light separating element, and adapted to convert the at least one laser beam into a converted beam; and
      a reflective element, disposed between the at least one laser light source and the wavelength conversion element, and having a reflective surface facing the wavelength conversion element, wherein the reflective surface has a second coating region, the second coating region is adapted to reflect the at least one laser beam from the wavelength conversion element, the second coating region and the at least one first coating region are adapted to reflect the converted beam, and the at least one laser beam and the converted beam constitute an illumination beam;
   a light valve, disposed on a transmission path of the illumination beam, and adapted to convert the illumination beam into an image beam; and
   a projection lens, disposed on a transmission path of the image beam,
   wherein the at least one first coating region and the second coating region together form a partial spherical surface, the wavelength conversion element is located on a first periapsis position of the partial spherical surface, and the illumination system further comprises a light homogenizing element, the light homogenizing element is located on a second periapsis position of the partial spherical surface, wherein a spherical center of the partial spherical surface is located between the first periapsis position and the second periapsis position and located on a connecting line of the first periapsis position and the second periapsis position, wherein the first periapsis position and the second periapsis position have a distance therebetween, and a ratio of the distance to a radius of the partial spherical surface is between 0.1 and 0.3.

2. The projection apparatus according to claim 1, wherein the wavelength conversion element comprises at least one wavelength conversion region and a wavelength reserved region, and the at least one wavelength conversion region and the wavelength reserved region are adapted to alternately move on the transmission path of the at least one laser beam, the at least one laser beam is converted into the converted beam by the at least one wavelength conversion region when the at least one wavelength conversion region moves on the transmission path of the at least one laser beam.

3. The projection apparatus according to claim 2, wherein the wavelength reserved region has a plurality of light guide structures, and the at least one laser beam transmitted to the wavelength reserved region are adapted to be guided to the second coating region by the light guide structures.

4. The projection apparatus according to claim 3, wherein a shape of each of the light guide structures is a taper.

5. The projection apparatus according to claim 1, wherein the at least one first coating region and the second coating region together form a partial elliptical surface or a partial spherical surface.

6. The projection apparatus according to claim 1, wherein the at least one laser light source is a plurality of laser light sources, the at least one first coating region is a plurality of first coating regions, and the first coating regions respectively correspond to the laser light sources.

7. An illumination system, comprising:
   at least one laser light source, adapted to generate at least one laser beam;
   at least one light separating element, located on a transmission path of the at least one laser beam from the at least one laser light source, and having at least one first coating region, wherein the at least one laser light source corresponds to the at least one light separating element, and the at least one laser beam is adapted to penetrate the at least one first coating region;
- a wavelength conversion element, located on a transmission path of the at least one laser beam from the at least one light separating element, and adapted to convert the at least one laser beam into a converted beam; and
- a reflective element, disposed between the at least one laser light source and the wavelength conversion element, and having a reflective surface facing the wavelength conversion element, wherein the reflective surface has a second coating region, the second coating region is adapted to reflect the at least one laser beam from the wavelength conversion element, the second coating region and the at least one first coating region are adapted to reflect the converted beam, and the at least one laser beam and the converted beam constitute an illumination beam,
- wherein the at least one first coating region and the second coating region together form a partial spherical surface, the wavelength conversion element is located on a first periapsis position of the partial spherical surface, and the illumination system further comprises a light homogenizing element, the light homogenizing element is located on a second periapsis position of the partial spherical surface, wherein a spherical center of the partial spherical surface is located between the first periapsis position and the second periapsis position and located on a connecting line of the first periapsis position and the second periapsis position, wherein the first periapsis position and the second periapsis position have a distance therebetween, and a ratio of the distance to a radius of the partial spherical surface is between 0.1 and 0.3.

8. The illumination system according to claim 7, wherein the wavelength conversion element comprises at least one wavelength conversion region and a wavelength reserved region, and the at least one wavelength conversion region and the wavelength reserved region are adapted to alternately move on the transmission path of the at least one laser beam, the at least one laser beam is converted into the converted beam by the at least one wavelength conversion region when the at least one wavelength conversion region moves on the transmission path of the at least one laser beam.

9. The illumination system according to claim 8, wherein the wavelength reserved region has a plurality of light guide structures, and the at least one laser beam transmitted to the wavelength reserved region are adapted to be guided to the second coating region by the light guide structures.

10. The illumination system according to claim 9, wherein a shape of each of the light guide structures is a taper.

11. The illumination system according to claim 7, wherein the at least one first coating region and the second coating region together form a partial elliptical surface or a partial spherical surface.

12. The illumination system according to claim 7, wherein the at least one laser light source is a plurality of laser light sources, the at least one first coating region is a plurality of first coating regions, and the first coating regions respectively correspond to the laser light sources.

13. An illumination system, comprising:
- at least one solid-state light source, adapted to generate at least one emission beam;
- at least one light separating element, located on a transmission path of the at least one emission beam from the at least one solid-state light source, and having at least one first coating region, wherein the at least one solid-state light source corresponds to the at least one light separating element, and the at least one emission beam is adapted to penetrate the at least one first coating region;
- a wavelength conversion element, located on a transmission path of the at least one emission beam from the at least one light separating element, and adapted to convert the at least one emission beam into a converted beam; and
- a reflective element, disposed between the at least one solid-state light source and the wavelength conversion element, and having a reflective surface facing the wavelength conversion element, wherein the reflective surface has a second coating region, the second coating region is adapted to reflect the at least one emission beam from the wavelength conversion element, the second coating region and the at least one first coating region are adapted to reflect the converted beam, and the at least one emission beam and the converted beam constitute an illumination beam,
- wherein the at least one first coating region and the second coating region together form a partial spherical surface, the wavelength conversion element is located on a first periapsis position of the partial spherical surface, and the illumination system further comprises a light homogenizing element, the light homogenizing element is located on a second periapsis position of the partial spherical surface, wherein a spherical center of the partial spherical surface is located between the first periapsis position and the second periapsis position and located on a connecting line of the first periapsis position and the second periapsis position, wherein the first periapsis position and the second periapsis position have a distance therebetween, and a ratio of the distance to a radius of the partial spherical surface is between 0.1 and 0.3.

\* \* \* \* \*